(12) United States Patent
Du

(10) Patent No.: US 8,761,607 B2
(45) Date of Patent: *Jun. 24, 2014

(54) OPTICAL SYSTEM FOR REDUCING STIMUALTED BRILLOUIN SCATTERING BY CONTROLLABLY CHANGING POLARIZATION DIRECTION OF AN OPTICAL SIGNAL

(75) Inventor: Detao Du, San Diego, CA (US)

(73) Assignee: General Atomics, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/250,457

(22) Filed: Sep. 30, 2011

(65) Prior Publication Data

US 2012/0019887 A1 Jan. 26, 2012

Related U.S. Application Data

(63) Continuation of application No. 12/049,251, filed on Mar. 14, 2008, now Pat. No. 8,054,539.

(51) Int. Cl.
*H04B 10/12* (2006.01)
*G02F 1/01* (2006.01)
*G02F 1/03* (2006.01)

(52) U.S. Cl.
USPC .......................... 398/152; 359/328; 359/337

(58) Field of Classification Search
USPC ........................ 359/328, 337; 398/152, 184
See application file for complete search history.

(56) References Cited

U.S. PATENT DOCUMENTS

| | | |
|---|---|---|
| 3,752,992 A | 8/1973 | Fluhr |
| 5,568,309 A | 10/1996 | Rockwell |
| 5,619,364 A | 4/1997 | Burns et al. |
| 5,787,211 A | 7/1998 | Gopalakrishnan |
| 5,930,024 A | 7/1999 | Atlas |
| 6,166,837 A | 12/2000 | Adams et al. |
| 6,282,003 B1 | 8/2001 | Logan, Jr. et al. |
| 6,414,772 B2 | 7/2002 | Miyazaki |
| 6,604,871 B2 | 8/2003 | Cao |
| 6,607,313 B1 | 8/2003 | Farries et al. |
| 6,850,712 B1 | 2/2005 | Delavaux et al. |
| 6,959,152 B2 | 10/2005 | Fujiwara et al. |
| 7,031,614 B2 | 4/2006 | Fujiwara et al. |
| 7,146,110 B2 | 12/2006 | Frederiksen, Jr. et al. |
| 8,054,539 B2 | 11/2011 | Du |
| 2003/0161638 A1 | 8/2003 | Fujiwara et al. |

OTHER PUBLICATIONS

Howerton, "SBS Suppression Using a Depolarized Source for High Power Fiber Applications", Journal of Lightwave Technology, vol. 14, No. 3, pp. 417-422, IEEE 1996.

Heismann, "High-Speed Polarization Scrambler With Adjustable Phase Chirp", IEEE Journal of Selected Topics in Quantum Electronics, vol. 2, No. 2, pp. 311-318 1996.

Yariv, "Optical Waves in Crystals: Propagation and Control of Laser Radiation", pp. 240-244, Wiley-Interscience, 2003.

(Continued)

*Primary Examiner* — Eric Bolda
(74) *Attorney, Agent, or Firm* — Fitch, Even, Tabin & Flannery, LLP

(57) ABSTRACT

An optical system having an input surface configured to receive an input optical signal having a polarization, and a polarization changer comprising the input surface and configured to generate two orthogonal polarization components from the input optical signal. The polarization changer also changes a direction of the polarization of the input optical signal in a controlled manner as a function of time while maintaining coherence of the two orthogonal polarization components in order to reduce stimulated Brillion scattering.

44 Claims, 13 Drawing Sheets

(56) References Cited

OTHER PUBLICATIONS

PCT; App. No. PCT/US2009/037154; International Search Report mailed Aug. 3, 2009.
PCT; App. No. PCT/US2009/037154; Written Opinion mailed Aug. 3, 2009.
USPTO; U.S. Appl. No. 12/049,251; Office Action mailed Apr. 22, 2010.
USPTO; U.S. Appl. No. 12/049,251; Interview Summary mailed Aug. 23, 2010.
USPTO; U.S. Appl. No. 12/049,251; Final Office Action mailed Dec. 7, 2010.
USPTO; U.S. Appl. No. 12/049,251; Notice of Allowance mailed Aug. 11, 2011.
USPTO; U.S. Appl. No. 12/049,251; Restriction Requirement mailed Mar. 4, 2010.

OPTICAL SYSTEM FOR REDUCING STIMUALTED BRILLOUIN SCATTERING BY CONTROLLABLY CHANGING POLARIZATION DIRECTION OF AN OPTICAL SIGNAL

This application is a continuation of U.S. application Ser. No. 12/049,251, filed Mar. 14, 2008, entitled OPTICAL SYSTEM FOR REDUCING STIMULATED BRILLOUIN SCATTERING BY CONTROLLABLY CHANGING POLARIZATION DIRECTION OF AN OPTICAL SIGNAL, which is incorporated in its entirety herein by reference.

BACKGROUND OF THE INVENTION

1. Field of the Invention

The present invention relates generally to optical systems, and more specifically to suppressing stimulated Brillouin scattering in an optical system.

2. Discussion of the Related Art

In long distance optical fiber transmission systems, it is desirable to launch signaling using as high an optical power as possible, enabling the lightwave signals to be transmitted with fewer additional components such as repeaters and amplifiers, which increase the cost of communication systems. However, the combination of high powered, narrow linewidth optical sources with low-loss single mode transmission fiber opens the possibility of signal degradation and increased bit error rates, attributable to a host of nonlinear fiber-related phenomena. These nonlinear phenomena include stimulated Brillouin scattering (SBS), stimulated Raman scattering, and self-phase modulation. Similarly, in high power fiber laser systems, it is desirable to obtain as high a power as possible and to maintain narrow linewidth for high coherence. SBS is the primary power limiting mechanism for achieving high power with narrow linewidth due to its low threshold.

Brillouin scattering, which may be present within a fiber or other medium, results from photons being scattered by localized refractive index variations induced by acoustic waves. These refractive index variations are typically caused by thermal fluctuation in the medium. At the presence of a strong light field, the variation of the refractive index is enhanced, and more light is scattered. This process is commonly referred to as stimulated Brillouin scattering. Ultimately, light from an intense forward propagating signal (commonly referred to as a "pump" signal) can provide gain for a backward propagating SBS or "Stokes" wave or signal. This scenario is a classical description of SBS.

SBS threshold power may be defined as the power level of an input optical pump signal at which the power of the backward Stokes wave becomes equal to the power level of the input optical pump signal at the fiber input. SBS threshold power generally increases with the linewidth of the light being propagated along a medium. For this reason, concern over the adverse effects of SBS was minimal—until the introduction of narrow linewidth laser sources. As use of narrow linewidth sources increases, such lasers are likely to be the optical source of choice for future optical fiber transmission systems, among other types of systems. In such systems, SBS has the potential for significantly contributing to signal degradation at relatively low input power levels.

Some techniques to suppress the effects of SBS include broadening the laser linewidth via phase modulation, frequency dithering, and amplitude or phase noise addition. Examples of such techniques are disclosed in U.S. Pat. Nos. 7,146,110 and 6,166,837. In some systems, SBS suppression takes the form of polarization scrambling, such as that which is disclosed in U.S. Pat. Nos. 6,414,772 and 5,787,211. Other techniques include increasing the mode area and/or reducing the fiber length to increase the SBS threshold. In some cases, fiber manufactures attempt to reduce the strength of acoustic wave in order to suppress SBS. As another example, U.S. Pat. No. 6,8507,12 is directed toward an optical fiber transmission system which introduces incoherence between the polarization states in order to reduce SBS.

SUMMARY OF THE INVENTION

In one embodiment, the invention can be characterized as an optical system having an input surface configured to receive an input optical signal having a polarization, and a polarization changer comprising the input surface and configured to generate two orthogonal polarization components from the input optical signal and change a direction of the polarization of the input optical signal in a controlled manner as a function of time while maintaining coherence of the two orthogonal polarization components.

In another embodiment, the invention can be characterized as a method for changing polarization of an optical signal. The method includes receiving an input optical signal comprising two orthogonal polarization components, generating two orthogonal polarization components from the input optical signal, and changing a direction of the polarization of the input optical signal in a controlled manner while maintaining coherence of the two orthogonal polarization components.

In a further embodiment, the invention can be characterized as an optical system having an input surface configured to receive an input optical signal having a polarization, and a polarization rotator comprising the input surface and configured to generate two orthogonal polarization components from the input optical signal and rotate a direction of the polarization of the input optical signal in a controlled manner as a function of time while maintaining coherence of the two orthogonal polarization components.

In a still further embodiment, the invention can be characterized as an optical system having a polarization rotator comprising an input surface configured to receive an input optical signal having a polarization, a modulator adapted to generate two orthogonal polarization components from the input optical signal, and a phase delay component adapted to rotate a direction of the polarization of the input optical signal in a controlled manner.

In one embodiment, the invention can be characterized as an optical system having an input surface configured to receive an input optical signal having two orthogonal polarization components, and a polarization alternator comprising the input surface and configured to receive a first orthogonal polarization component of the two orthogonal polarization components, the phase modulator being configured to induce an alternating two-state phase delay of the first orthogonal polarization component relative to a second orthogonal polarization component of the two orthogonal polarization components, wherein the alternating two-state phase delay causes a direction of the polarization of the input optical signal to alternate between two different directions in a controlled manner.

BRIEF DESCRIPTION OF THE DRAWINGS

The above and other aspects, features and advantages of several embodiments of the present invention will be more apparent from the following more particular description thereof, presented in conjunction with the following drawings.

Figure 1:
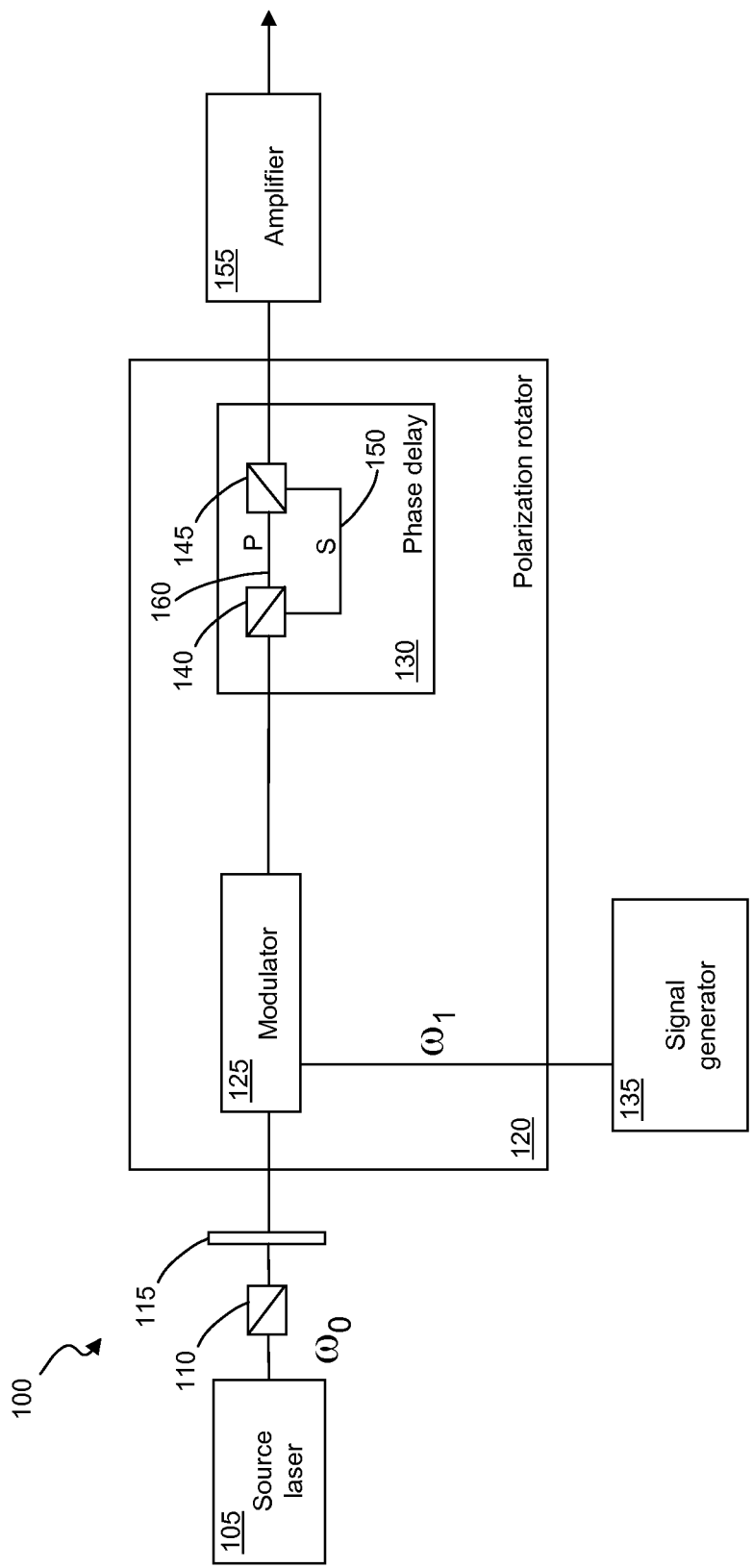
FIG. 1 is a block diagram depicting an optical system for rotating polarization of an optical signal to reduce stimulated Brillouin scattering (SBS) in accordance with an embodiment of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Various embodiments will be described in which a polarization change is achieved in a controlled manner. This feature contrasts the uncontrolled polarization scrambling implemented in various types of conventional systems. Examples of the types of polarization changes that may be achieved include causing a rotation of the polarization direction of an input optical signal, and causing the polarization direction of an input optical signal to alternate between two different directions.

Further embodiments include providing a polarization change while maintaining the coherence of the two orthogonal polarization components. This approach contrasts many conventional systems which introduce incoherence between the polarization states.

By way of non-limiting example, various embodiments of the present invention will be described in the context of reducing or suppressing the effects of stimulated Brillouin scattering (SBS). However, such teachings apply also to other applications and scattering conditions.

SBS involves the formation of an acoustic wave which interacts with the pump signal, also referred to herein as an optical signal, to generate the Stokes wave. It is understood that if the gain of the acoustic wave is reduced, the gain of the SBS will be suppressed.

Various embodiments presented herein effectively reduce the gain of the acoustic wave, thus increasing the threshold of SBS. In general, the formation of the acoustic wave is governed by the equation:

$$\left(\frac{\partial}{\partial t} + \frac{1}{2\tau_B}\right)Q = \gamma \vec{E_L} \cdot \vec{E_S} \qquad \text{Eq. (1)}$$

Where $\tau_B$ is the lifetime of the acoustic wave, Q is the acoustic field, $\gamma$ is related to the electrostriction coefficient, and the gain of the SBS is proportional to $\gamma^2$. $E_L$ and $E_s$ are the vector fields of the pump signal and the Stokes wave, respectively. When the polarizations of the two fields are orthogonal to each other, their vector product is zero and there is no acoustic wave generated. Therefore, there is no stimulated Brillouin gain under such conditions.

According to various embodiments, this property of SBS will be exploited to suppress the gain of the SBS. For example, in order to maintain the ability to amplify a narrow linewidth, polarized beam, the polarization direction of this beam may be rotated over time. The backward propagating Stokes wave has a fixed polarization. Accordingly, as the Stokes wave propagates backwards, it interacts with the pump signal with a rotating polarization. The Brillouin gain oscillates from maximum to zero. Therefore, the integrated gain over the fiber length is substantially reduced. These and other advantages are possible using various implementations which will now be discussed.

FIG. 1 is a block diagram depicting an optical system for rotating polarization of an optical signal to reduce stimulated Brillouin scattering (SBS) in accordance with an embodiment of the present invention. Optical system 100 includes source laser 105 optically coupled to polarizer 110 and wave plate 115. Polarization rotator 120 is shown having modulator 125 and phase delay component 130. The modulator is shown in electrical communication with signal generator 135. The phase delay component includes polarization beam splitter 140 and polarization beam combiner 145. A delay element 150 is shown optically coupling the beam splitter and the beam combiner. An optical signal, which may include a rotating polarization, is shown output from polarization rotator 120 and is provided to amplifier 155.

Source laser 105 may be implemented using an optical source that can be configured to generate an optical signal at a desired bandwidth. The source laser may be implemented using known optical sources, such as a narrowband or broadband source. In narrowband applications, the optical source provides a single frequency optical signal having an amplitude which is constant or substantially constant. Typical narrowband implementations include bandwidths on the order of 10 Hz to 1 MHz, for example. Particular types of optical sources that may be implemented include semiconductor lasers, solid state lasers, fiber lasers, and the like.

Polarizer 110 is typically configured to convert the optical signal from source laser 105 into a polarized optical signal having a polarization. In general, the polarizer is a device that converts an unpolarized or mixed-polarization beam of electromagnetic waves (e.g., light) into a beam or optical signal with a single polarization state, such as a signal having a single linear polarization. In an embodiment, the polarization of the polarized optical signal is constant or substantially constant.

Wave plate 115 is shown positioned between modulator 125 and polarizer 110. The wave plate may be configured to rotate the direction of the polarization of a polarized optical signal so that the polarization of the optical signal effectively aligns with the optical axis of modulator 125. In an embodiment, the wave plate is implemented using a conventional half-wave plate.

Modulator 125 is typically used to modulate the polarized optical signal to generate two orthogonal polarization components responsive to an electrical or other control signal provided by, for example, signal generator 135. In an embodiment, the two orthogonal polarization components each include an amplitude which varies at a frequency (e.g., frequency $\omega_1$). The modulator is generally implemented using non-linear optical material. Specific examples of suitable types of modulators include a Lithium Niobate (LiNbO3) modulator, a fiber optic modulator, a bulk optics modulator, a non-linear crystal, magnesium-oxide-doped Lithium Niobate modulators, and the like.

Signal generator 135 is typically configured to generate a control signal oscillating at frequency $\omega_1$, which is then provided to modulator 125. The type of waveform generated is not critical, and most any type of alternating waveform may be used. Examples of such waveforms include sinusoidal, sawtooth, triangle, and square, among others.

Polarization beam splitter 140 is positioned to receive the modulated optical signal from modulator 125. The beam splitter is functionally configured to separate the two orthogonal polarization components of the polarized optical signal. These polarization components are denoted P and S in FIG. 1.

The P polarization component is shown coupled to signal path 160 and the S polarization component is shown coupled to a signal path comprising delay element 150. It is to be noted that these signal paths may include polarization-maintaining optical fibers, integrated waveguides, or any other media suitable for supporting the propagation of the polarization components.

At beam splitter 140, the amplitude of the transmitted polarization component, which is depicted as the P component, can be demonstrated by the following formula:

$$A(t) = \operatorname{Sin}[\omega_1 t + \phi] \quad \text{Eq. (2)}$$

Also at beam splitter 140, the amplitude of the rejected component, which is depicted as the S component, can be demonstrated by the following formula:

$$B(t) = \operatorname{Cos}[\omega_1 t + \phi] \quad \text{Eq. (3)}$$

In the embodiment of FIG. 1, the polarization beam splitter causes one of the polarized components (e.g., the S component) to pass through delay element 150, which induces a delay in the S component relative to the P component. A typical delay may be expressed by the following formula:

$$+/-(2n+1)\pi/2 \quad \text{Eq. (4)}$$

If desired, the amount of delay is minimized to maintain the coherence of the two polarization components. One embodiment includes delaying the S component so that it is 90 degrees out of phase with respect to the P component. If optical fiber is used for the delay element, then the desired delay may be implemented by including an additional length of optical fiber.

Polarization beam combiner 145 is typically implemented to combine each of the separated orthogonal polarization components to provide an output optical signal having a time dependent polarization. In the example of FIG. 1, the beam combiner functions to couple or otherwise combine the signals associated with the S and P components and provide them as the output optical signal. In an embodiment, the output signal includes a polarization which rotates in time at a rate controlled by the control signal provided by signal generator 135. As an example, the amplitude of the combined signal (i.e., the output optical signal provided by phase delay component 130), can be demonstrated by the following formula:

$$\vec{A}'(t) = \frac{\sqrt{2}}{2} \operatorname{Sin}[\omega_1 t + \phi]\vec{s} + \frac{\sqrt{2}}{2} \operatorname{Cos}[\omega_1 t + \phi]\vec{p} \quad \text{Eq. (5)}$$

If desired, the output optical signal provided by phase delay component 130 may be provided to amplifier 155, which provides amplification to the output optical signal. Although amplification is not critical to various embodiments, when implemented, the amplifier may provide amplification ranging from milliwatt levels to kilowatt levels.

In general, the potential for SBS generally rises in relation to an increase in the amplification level of an optical signal. In the illustrated embodiments, the SBS reacts to the rotating polarization of the output optical signal in such a manner that the effective SBS gain is reduced. Accordingly, the benefits provided for by embodiments of the present invention will become increasingly more evident as the amplitude of the signal increases.

Other benefits of the depicted system are that the output optical signal is in a known polarization state, and that the coherence of the two orthogonal polarization components is maintained. Thus, the output optical signal can be used by other processes such as, for example, a coherent beam combining system. A typical beam combining system will combine a number of optical signals, such as those produced by optical system 100, and then combine such signals to form a more-powerful optical signal. An example of such a system will be described later.

Operation of optical system 100 in accordance with an embodiment of the present invention may proceed as follows. Source laser 105 generates an input optical signal having a substantially constant amplitude. In some cases, the input optical signal includes a seed beam. If signal conditioning is needed or desired, the optical signal is acted upon by one or more optional components such as polarizer 110, wave plate 115, or both components such as that depicted in FIG. 1.

When implemented, polarizer 110 functions to convert the optical signal from source laser 105 into a polarized optical signal having a polarization. Wave plate 115 receives the optical signal from the polarizer, and rotates the direction of the polarization of the optical signal so that the polarization of the optical signal effectively aligns with the optical axis of modulator 125

Modulator 125 modulates the polarized optical signal responsive to a control signal provided by signal generator 135 to generate two orthogonal polarization components. Polarization beam splitter 140 is typically positioned to receive the polarized optical signal from the modulator, and may be configured to separate the two orthogonal polarization components. For instance, the P polarization component is shown propagating along signal path 160, and the S polarization component is shown propagating along a different signal path which includes delay element 150. In this example, the delay element induces a phase delay of the S polarization component relative to the P polarization component.

Polarization beam combiner 145 then combines each of the two orthogonal polarization components (e.g., the P and S polarization components) to provide an output optical signal having a polarization rotating in a direction and at a rate controlled by the control signal of the signal generator. In accordance with various embodiments, this rotating polarization is achieved in a controlled manner while maintaining the coherence of the two orthogonal polarization components. If amplification is desired, the output optical signal, which may be a linearly polarized optical signal, is directed to amplifier 155.

Various embodiments of the present invention have been described, but still further features may alternatively or additionally be implemented in accordance with alternative embodiments. One such feature relates to positioning of wave plate 115. If desired, this wave plate may alternatively be positioned between modulator 125 and polarization beam combiner 140. Another alternative is to implement the functionality of wave plate 115 within modulator 125 or source laser 105. A further alternative is to operationally implement the functionality of polarizer 110 and wave plate 115 within source laser 125.

Another alternative is to switch the roles of the P and S polarization components. For instance, the S polarization component may be directed onto signal path 160 and the P polarization component may be directed onto the signal path comprising phase delay element 150.

Figure 2:
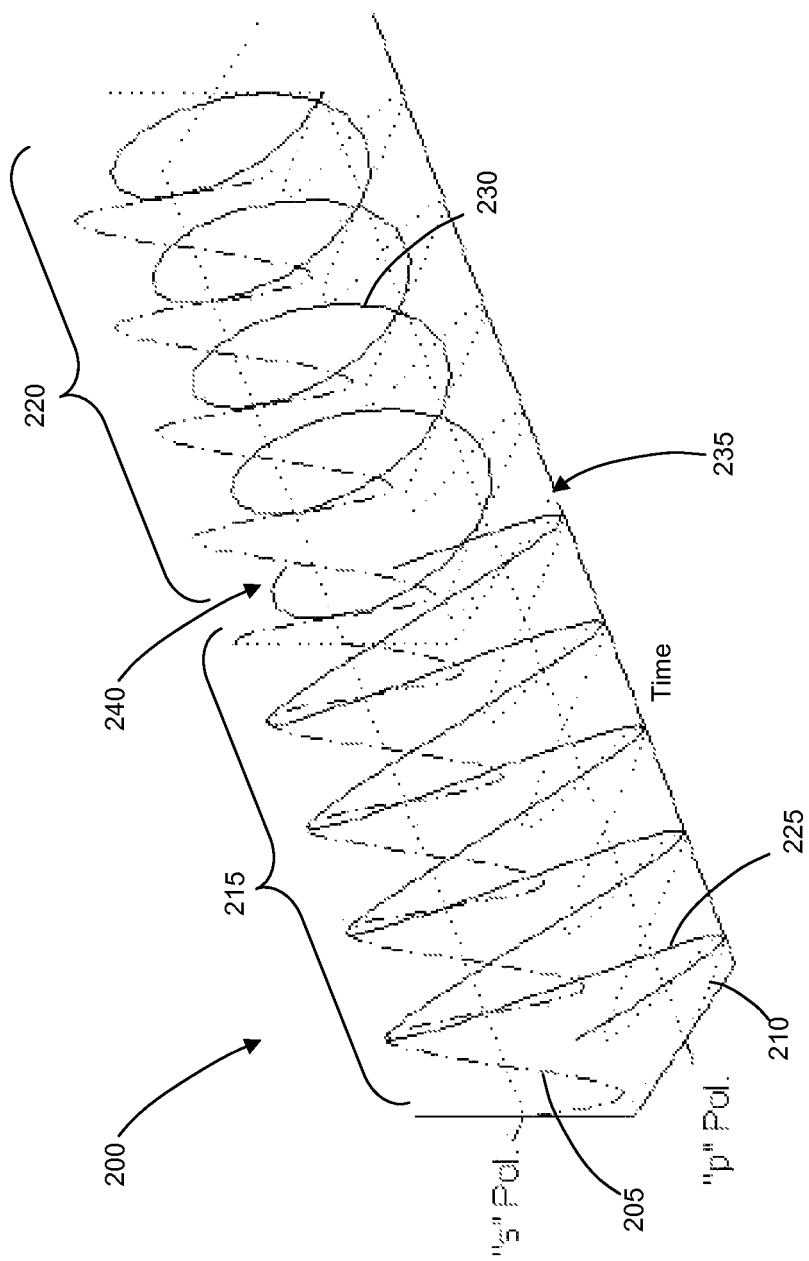
FIG. 2 is a graph showing the conversion of linearly polarized light into linearly polarized light having rotating polarization, as provided in one embodiment of using the optical system of FIG. 1.

FIG. 2 is a graph showing the conversion of linearly polarized light into linearly polarized light having rotating polarization in accordance with an embodiment of the present invention. In particular, optical signal 200 is shown having an S polarization component 205, which is orthogonal to the P polarization component 210. The signal is also shown divided into two portions, denoted as first portion 215 and second portion 220.

First portion 215 is characterized by the optical signal provided by or output from modulator 125 (FIG. 1). In particular, polarization 225 is an example of the polarization of the composite of two orthogonal polarization components, such as S polarization component 205 and P polarization component 210.

In contrast, second portion 220 is characterized by the optical signal provided by or output from phase delay component 130. More specifically, polarization 230 is an example of a rotating polarization which rotates over time. In an embodiment, the resultant output optical signal provided by phase delay component 130 includes a linearly polarized signal having a polarization 230 rotating in time at frequency $\omega_1/2\pi$.

FIG. 2 also depicts point 235, which relates to the time at which the polarization of the input optical signal is converted into a rotating polarization. Note the location of gap 240, occurring at point 235, and which is between the end of polarization 225 and the beginning of polarization 230. This gap illustrates an example of the effect of the phase delay induced by phase delay element 150 (FIG. 1).

When the oscillation frequency is the same as source laser 105, the result is a circularly polarized optical signal. However, when the oscillation frequency approximates the RF frequency of the modulating signal, the result is a linearly polarized optical signal having rotating polarization, such as that which is depicted in FIG. 2.

Figure 3:
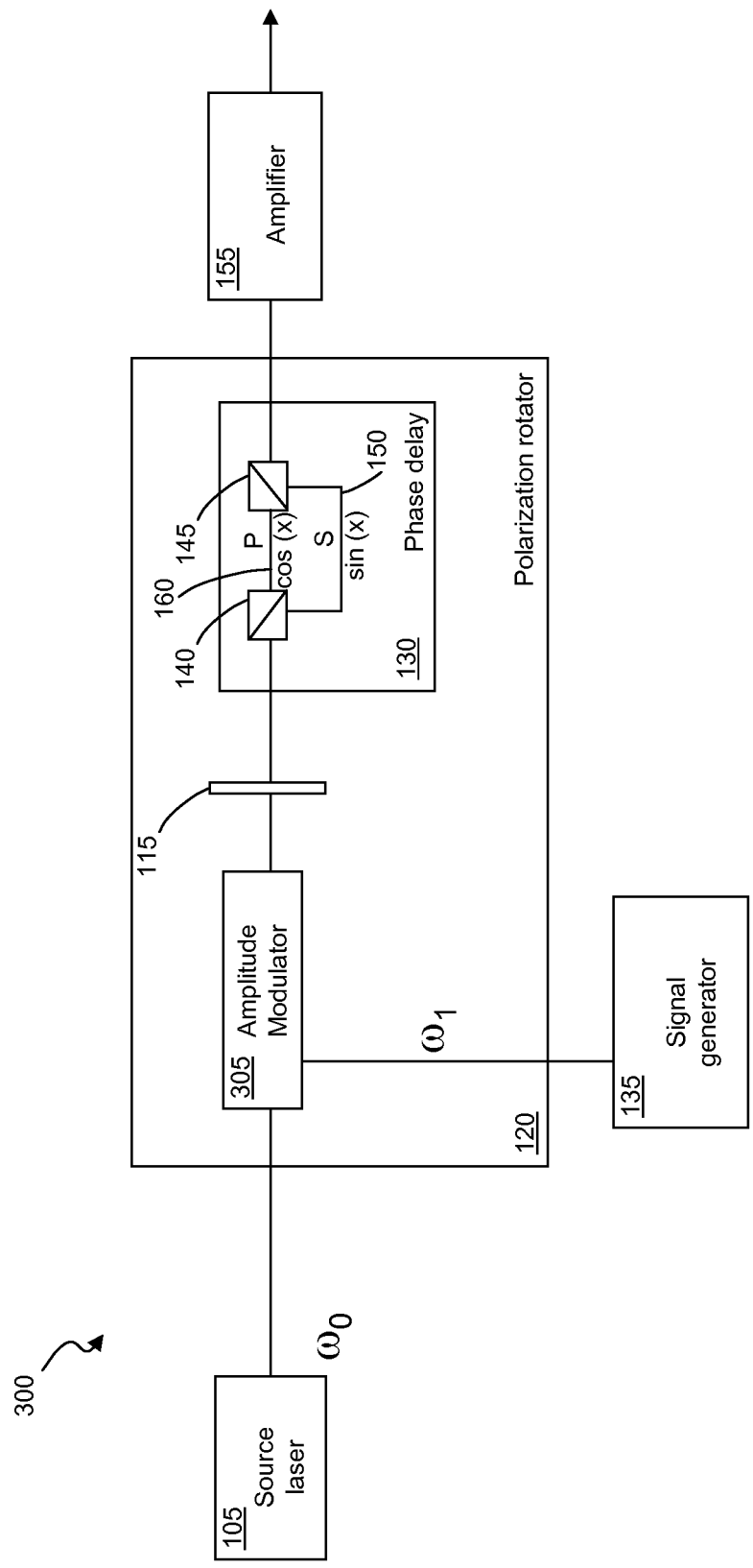
FIG. 3 is a block diagram depicting an optical system for rotating polarization of an optical signal to reduce stimulated Brillouin scattering (SBS) in accordance with another embodiment of the present invention.

FIG. 3 is a block diagram depicting an optical system for rotating polarization of an optical signal to reduce stimulated Brillouin scattering (SBS) in accordance with another embodiment of the present invention. Optical system 300 is similar in many respects to optical system 100 of FIG. 1. One difference between these systems relates to the type of modulator utilized by polarization rotator 120. In particular, the polarization rotator of optical system 300 includes amplitude modulator 305.

Amplitude modulator 305 is typically used to modulate the input optical signal received from source laser 105. Amplitude modulator 305 functions to modulate the input optical signal to generate two orthogonal polarization components responsive to an electrical or other control signal provided by, for example, signal generator 135. In an embodiment, the two orthogonal polarization components each include an amplitude which varies at a frequency (e.g., frequency $\omega_1$). The amplitude modulator may be implemented using materials which are the same or similar to those used for modulator 125 of FIG. 1.

Wave plate 115 is shown positioned between amplitude modulator 305 and polarization beam splitter 140. The wave plate may be configured to rotate or otherwise change the direction of the polarization of the optical signal provided by amplitude modulator 305. An example of this change in direction includes changing the direction of polarization of the optical signal so that the polarization of the optical signal is offset (e.g., 45 degrees) relative to the optical axis of polarization beam splitter 140. This offset assists polarization beam splitter 140 in separating the two orthogonal polarization components in such a manner that each of these polarization components will have substantially equal amplitude.

The optical signal leaving wave plate 115 is then acted upon by the various components of phase delay component 130 in a manner similar to that which was described with regard to FIG. 1. Accordingly, the output optical signal provided by phase delay component 130 includes a polarization rotating at a rate controlled by the control signal of signal generator 135. In accordance with various embodiments, this rotating polarization is achieved in a controlled manner while maintaining the coherence of the two orthogonal polarization components. An example of this rotating polarization of an optical signal is polarization 230 of FIG. 2.

Figure 4:
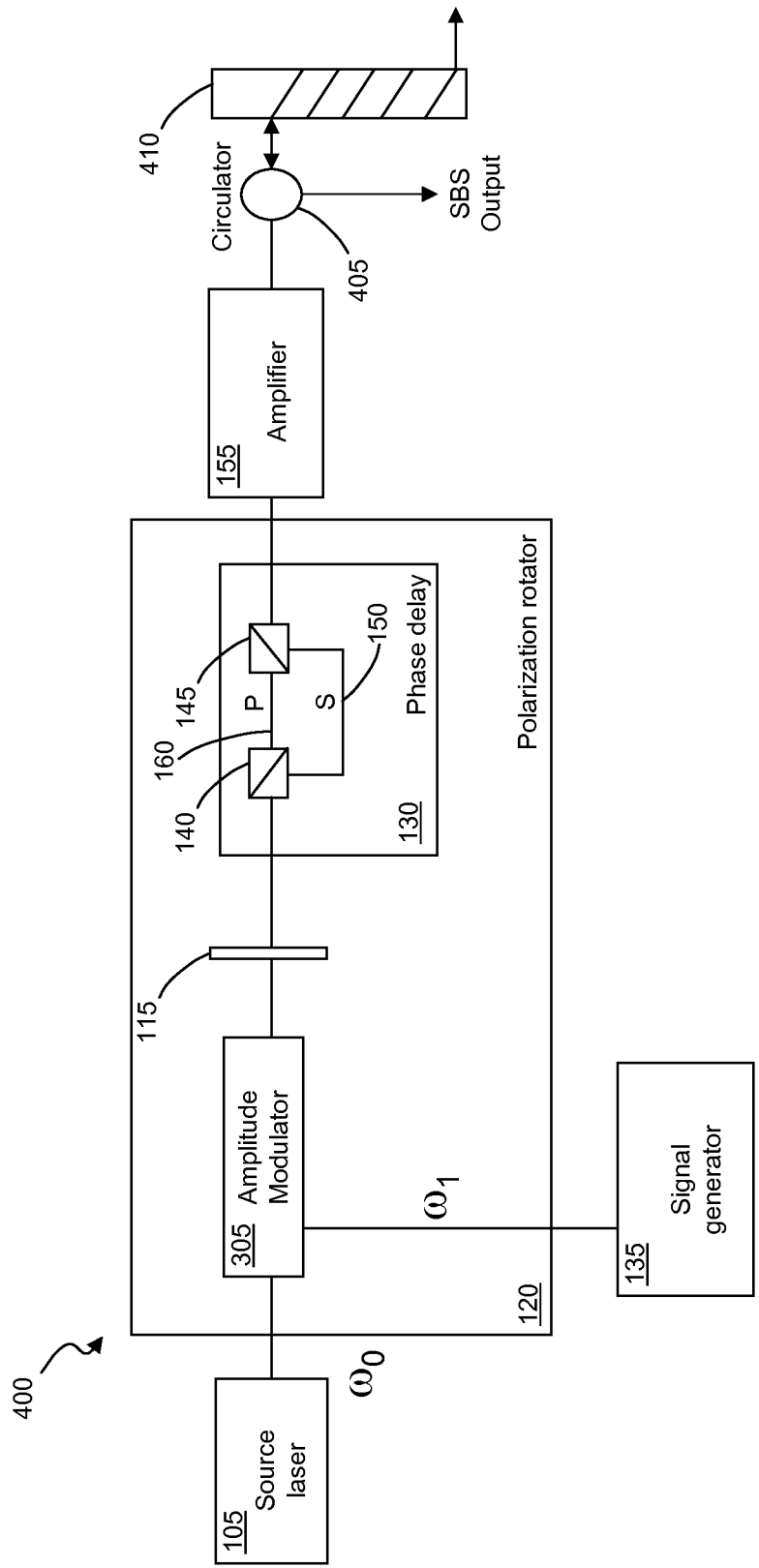
FIG. 4 is a block diagram depicting an experimental setup of an optical system for rotating polarization direction of an optical signal to reduce stimulated Brillouin scattering (SBS) in accordance with another embodiment of the present invention.

FIG. 4 is a block diagram depicting an experimental setup of an optical system for rotating polarization direction of an optical signal to reduce stimulated Brillouin scattering (SBS) in accordance with another embodiment of the present invention. Optical system 400 is similar in many respects to optical system 300 of FIG. 3. One difference between these systems relates to the use of test components in the example of FIG. 4. In particular, optical system 400 is shown providing an output optical signal to circulator 405, which in turn provides the signal to a spool of optical fiber 410. In the illustrated example, optical fiber 410 is implemented using single mode fiber that is approximately 26 km in length.

Circulator 405 is generally a passive component providing several functions. First, the circulator permits the output optical signal from amplifier 155 to pass to the spool of optical fiber 410. Second, the circulator receives SBS from the fiber and then provides this as SBS output which can be measured. The SBS output typically occurs when the input power is increased beyond the onset of the SBS threshold.

Experiments were performed during which the polarization rotator 120 and associated components were activated. The results of such testing was also compared with an optical system which did not include the polarization rotator, such that an amplified output optical signal was applied to optical fiber 410 without the benefit of polarization rotator 120.

Figure 5:
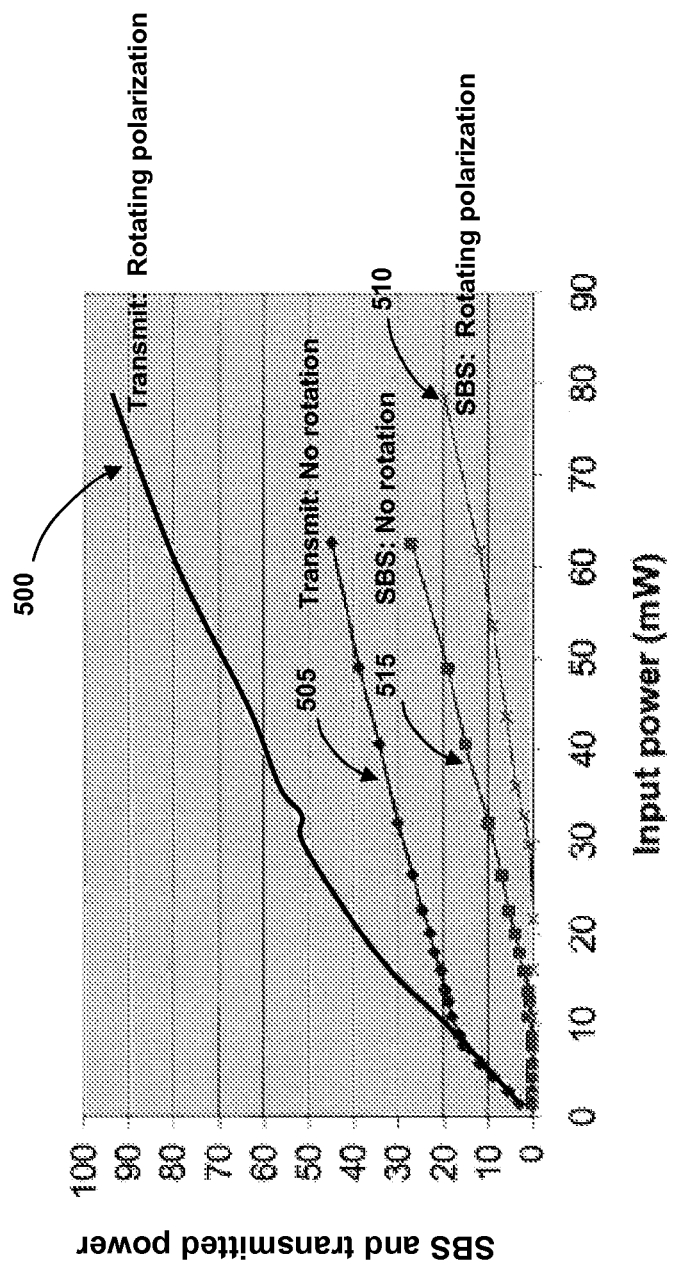
FIG. 5 is a graph depicting results using the optical system of FIG. 4.

FIG. 5 is a graph depicting results using the optical system of FIG. 4. The Y-axis relates to measurements for both the transmitted power of the optical signal (measured at the output of optical fiber) and the measurements of the SBS Stokes wave power (measured at the SBS output of circulator 405). The X-axis relates to the amplified optical signal provided by amplifier 155 and which is input to optical fiber 410 via circulator 405.

Turning now to the graph, line 500 represents the transmitted power of the optical signal through optical fiber 410 while the polarization rotator 120 is operating. As such, the optical signal represented by line 500 includes a rotating polarization as provided by polarization rotator 120. Line 505 represents the transmitted power of the optical signal through the same optical fiber 410, but without using the polarization rotator.

Line 510 represents the SBS Stokes wave power as measured at the SBS output of circulator 405 while the polarization rotator 120 was operating, and thus, line 510 is associated with the transmitted power measurements of line 500. According to this graph, the SBS threshold (i.e., the point of the onset of SBS) occurs when the input power (i.e., the output of amplifier 155) is at about 30 mW.

In contrast to line 510, line 515 represents the SBS Stokes wave power measured while polarization rotator 120 was not operating. It is notable that without use of the polarization rotator, the SBS threshold occurs at a much lower power level. In particular, the SBS threshold of line 515 occurs when the input power is at about 13 mW.

The graph therefore illustrates that the SBS threshold may be increased, from 13 mW to 30 mW in this particular example, by producing an output signal having a rotating polarization. This enables power increases for amplified optical signals while remaining below the SBS threshold. The data associated FIG. 5 was obtained using the optical system of FIG. 4; however, other embodiments experience similar behavior.

Figure 6:
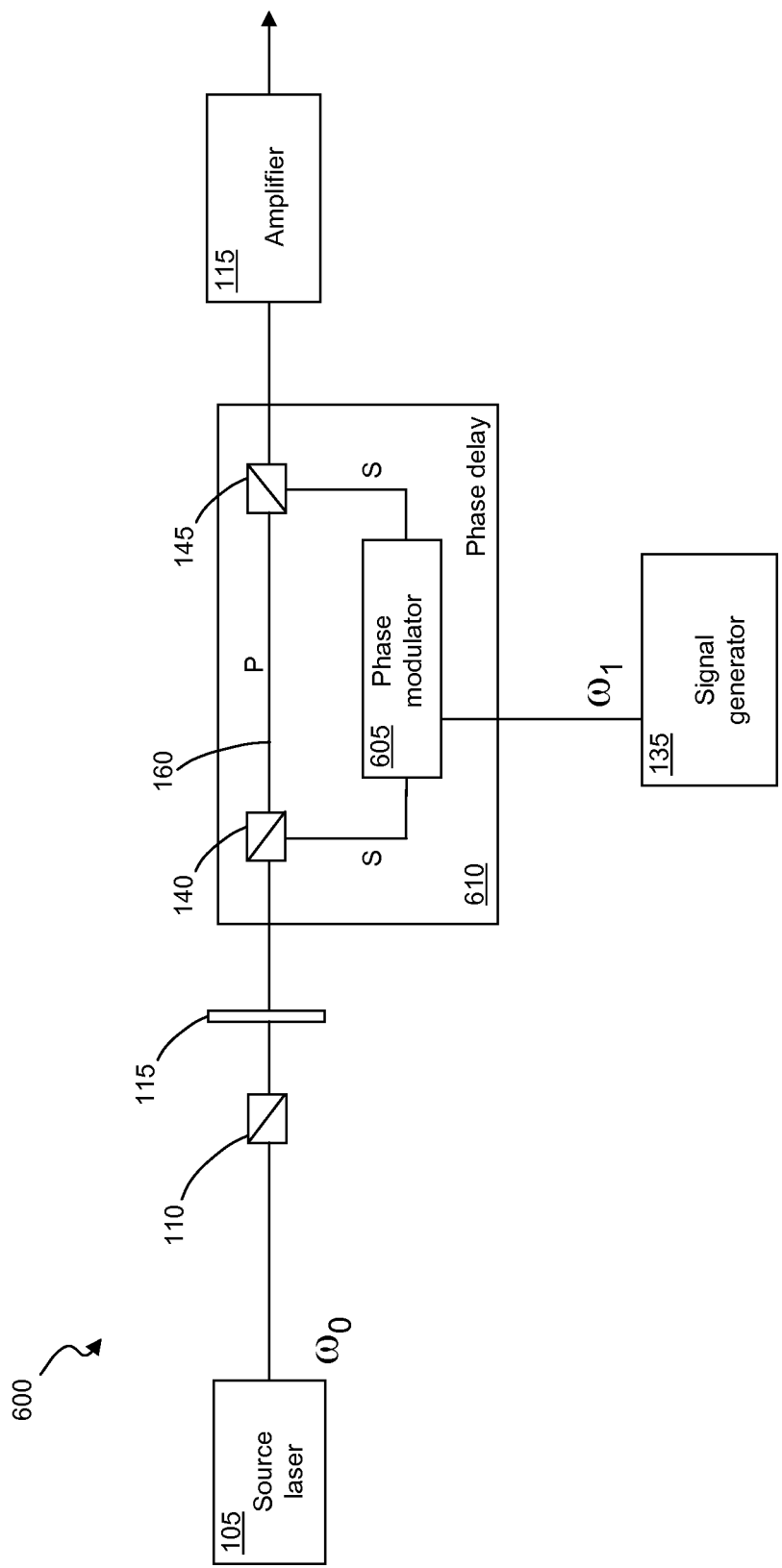
FIG. 6 is a block diagram depicting an optical system for switching polarization of an optical signal between two states to reduce stimulated Brillouin scattering (SBS) in accordance with yet another embodiment of the present invention.
Figure 7:
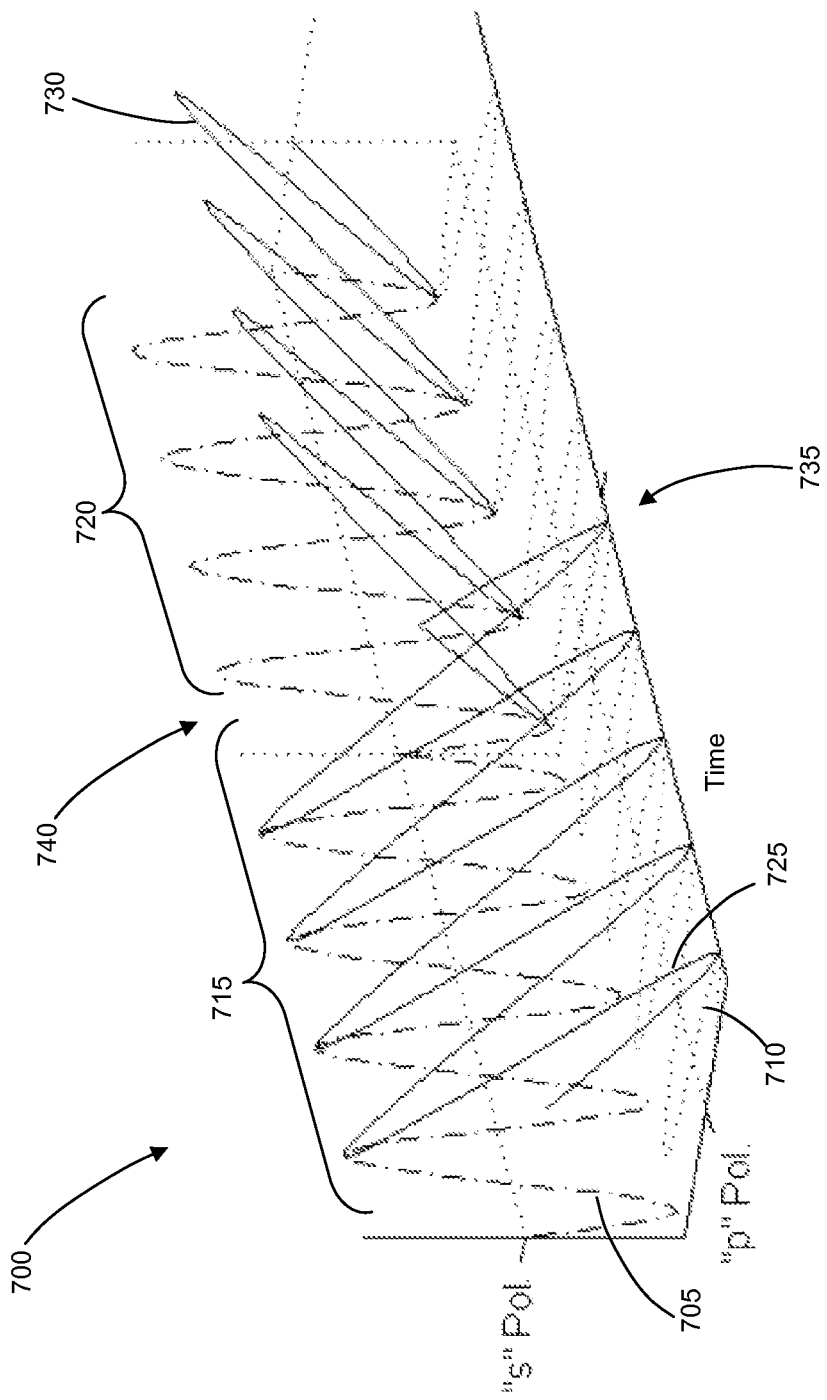
FIG. 7 is a graph showing an output optical signal having a polarization which alternates between two states.

FIG. 6 is a block diagram depicting an optical system for switching polarization of an optical signal between two states to reduce stimulated Brillouin scattering (SBS) in accordance with yet another embodiment of the present invention. Optical system 600 is similar in some respects to the previously described optical systems. However, in contrast to other embodiments which provide a rotating polarization, the system of FIG. 6 alternates the polarization direction of an optical signal to produce an output optical signal. Phase modulator 605 is one technique which may be used to obtain this alternating feature, also referred to as two-state polarization switching. An example of a signal undergoing two-state polarization switching is depicted in the graph of FIG. 7, and will be described in more detail with regard to that figure.

Phase modulator 605 is included in phase delay component 610, and is shown positioned relative to polarization beam splitter 140 in order to receive an optical signal having one polarized component (e.g., the S component). In some embodiments, the phase delay component 610 functions as a polarization alternator. The phase modulator may be configured to induce an alternating two-state phase delay of a first orthogonal polarization component (e.g., the S polarization component) relative to a second orthogonal polarization component (e.g., the P polarization component). In an embodiment, this alternating two-state phase delay causes the polarization direction of a polarized output optical signal to alternate between two different directions.

Referring still to FIG. 6, operation of optical system 600 in accordance with an embodiment of the present invention may proceed as follows. Source laser 105 generates an input optical signal. In an embodiment, the input optical signal includes substantially constant amplitude.

In contrast to other embodiments, wave plate 115 of FIG. 6 is shown positioned between polarization beam splitter 140 and polarizer 110. The wave plate may be configured to rotate or otherwise change the direction of the polarization of a polarized optical signal so that the polarization of the optical signal is offset (e.g., 45 degrees) relative to the optical axis of polarization beam splitter 140. This offset assists polarization beam splitter 140 in separating the two orthogonal polarization components in such a manner that each of these polarization components will have substantially equal amplitude. In an embodiment, the wave plate is implemented using a conventional half-wave plate.

As in other embodiments, polarizer 110 and wave plate 115 are optional components and are usually implemented if signal conditioning of the input optical signal is needed or desired. In some cases, the functionality provided by the polarizer and wave plate are implemented in source laser 105. Regardless of which option is implemented, an input optical signal provided to polarization beam splitter 140 includes two orthogonal polarization components (e.g., the P component and the S component).

Polarization beam splitter 140 is shown positioned to receive the polarized optical signal from wave plate 115. The beam splitter is functionally configured to separate the two orthogonal polarization components of the polarized optical signal. These polarization components are denoted P and S in FIG. 6. The P component propagates along signal path 160 and the S polarization component propagates along a different signal path which includes phase modulator 605.

In an embodiment, phase modulator induces an alternating two-state phase delay of the orthogonal polarization component of a first optical component (e.g., the polarization component) relative to a second orthogonal polarization component (e.g., the P polarization component).

As one example, the first state of the two-state phase delay causes a substantially 180 degree phase delay of the first orthogonal polarization component relative to the second orthogonal polarization component. This first state may result in a 90 degrees change in polarization of the input optical.

In addition, a second state of the two-state phase delay causes effectively no phase delay of the first orthogonal polarization component relative to the second orthogonal polarization component. This second state may result in effectively no change of polarization of the input optical signal. An example of a two-state phase delay is depicted in the graph of FIG. 7, and will be described in more detail with regard to that figure.

Phase modulator 605 is typically controlled by signal generator 135, which again may generate a control signal oscillating at frequency $\omega_1$. In this embodiment, the frequency may be in the range of 100 MHz to 1 GHz, for example.

Polarization beam combiner 145 is shown optically coupled to signal path 160 and the signal path having phase modulator 605. As illustrated, polarization beam combiner 145 then combines each of the two orthogonal polarization components (e.g., the P and S polarization components) to provide an output optical signal having a polarization which alternates between two orthogonal states. In this embodiment, the alternating two-state phase delay provided by the phase modulator 605 causes this alternating of the polarization of the output optical signal.

When the first state of the two-state phase delay causes a substantially 180 degree phase delay of the first orthogonal polarization component relative to the second orthogonal polarization component, the results is a polarization change in the input optical signal of about 90 degrees. In accordance with various embodiments, this polarization change is achieved in a controlled manner while maintaining the coherence of the two orthogonal polarization components.

FIG. 7 is a graph showing an output optical signal having a polarization which alternates between two orthogonal states. In particular, optical signal 700 represents a signal which may be output by phase delay component 610 of FIG. 6 and is shown having an S polarization component 705 which is orthogonal to the P polarization component 710. The signal is also shown having two states, denoted as first state 715 and second state 720. It is understood that over time, these states will repeat according to the two-state phase delay provided by phase modulator 605 and cooperating signal generator 135.

First state 715 is characterized by polarization 725, which is shown having a defined polarization orientation. Second state 720 is characterized by polarization 730, which has a polarization orientation which is substantially orthogonal to the orientation of polarization 725.

FIG. 7 also depicts point 735, which relates to the point of time at which the phase delay of phase modulator 605 alternates from one state to a second state. For example, first state 715 may result when phase modulator 605 is in one state of the two-state phase delay, which effectively causes no phase delay of one of the two orthogonal polarization components.

On the other hand, second state 720 may result when the phase modulator switches to a second state of the two-state phase delay. This effectively causes a substantially 90 degree phase delay of one polarization component (e.g., the S component) relative to another polarization component (e.g., the P component). As a result, the polarization direction of the optical signal provided by phase delay component 610 will switch from one orientation, such as that exhibited by first state 715, to a substantially orthogonal orientation, such as that exhibited by second state 720. Alternating between these two states will typically result in full SBS gain for a period of time, and then significantly reduced SBS gain for another period of time.

Figure 8:
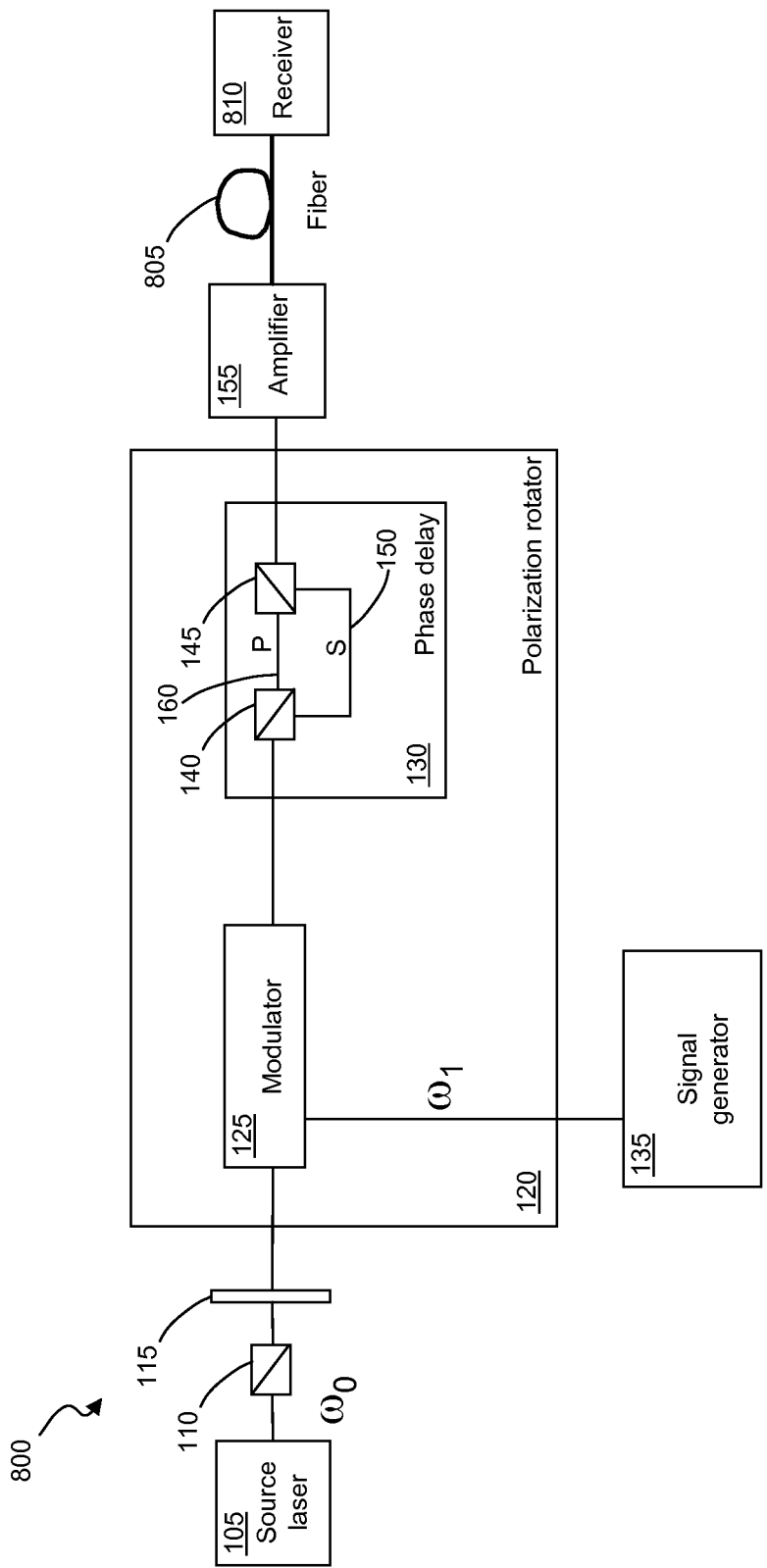
FIG. 8 is a block diagram depicting the optical system of FIG. 1 implemented as a fiber optic communication system in accordance with another embodiment of the present invention.

FIG. 8 is a block diagram depicting the optical system of FIG. 1 implemented as a fiber optic communication system in accordance with another embodiment of the present invention. Various components of the system, such as laser source 105, polarization rotator 120, and associated components, operate in a manner similar to that previously described. FIG. 8 also shows optional amplifier 155 optically coupled to fiber 805, which in turn is coupled to receiver 810. The optical medium that may be used to implement fiber 805 includes single mode fiber, single mode polarization-maintaining (PM) fiber, double clad single mode fiber, double clad PM fiber, photonic band gap fiber, photonic crystal fiber (or holey fiber), rare earth doped fiber used with any of these fiber types, and the like.

In operation, polarization rotator 120 provides an output optical signal having a polarization rotating at a rate controlled by the control signal of signal generator 135. This signal is then amplified by amplifier 155 and is introduced to fiber 805. Ultimately, the signal is received by receiver 810.

The rotating polarization of the output optical signal experiences reduced SBS as compared to conventional (e.g., non-rotating) optical signals. Because of the reduction of SBS, the power of the optical signal applied to fiber 805 may be increased. This permits longer fiber runs between signal repeaters, thus avoiding costs associated with such equipment. It is understood that any of the optical systems disclosed herein may alternatively be implemented in cooperation with fiber 805 and receiver 801.

Figure 9:
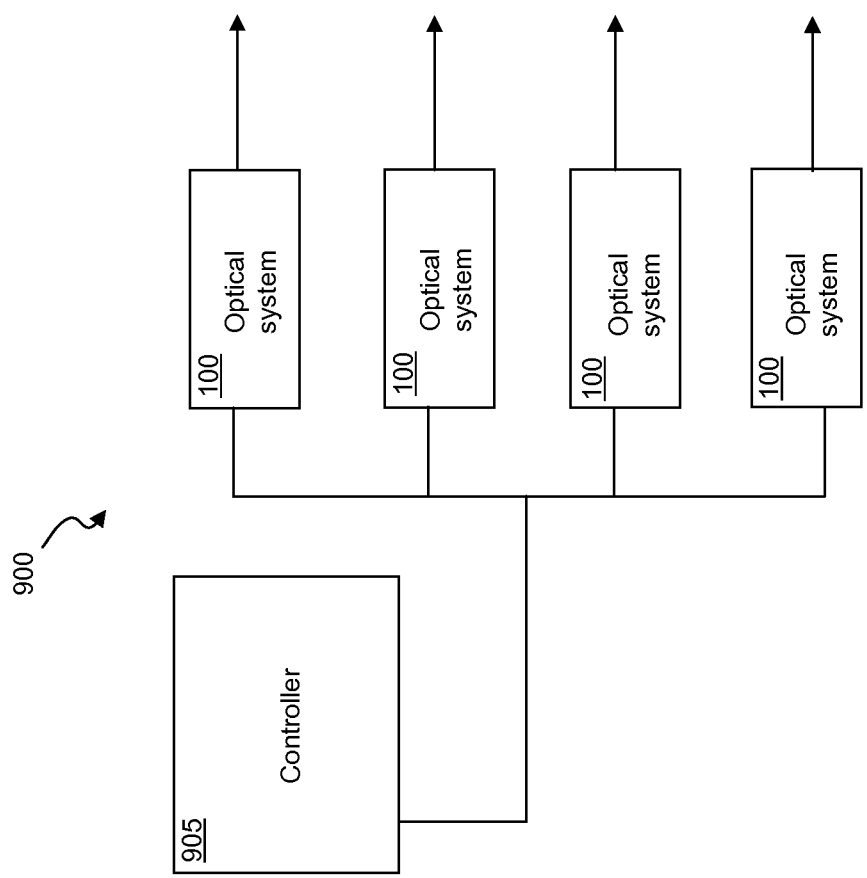
FIG. 9 is a block diagram depicting multiple optical systems individually generating an optical output signal in accordance with a further embodiment.

FIG. 9 is a block diagram depicting multiple optical systems individually generating an optical output signal in accordance with a further embodiment. In particular, system 900 includes controller 905 operatively coupled to a number of optical systems 100. Each of these optical systems 100, an example of which is shown in FIG. 1, is shown generating an optical signal having a rotating polarization. Recall that optical system 100 provides this optical signal with a polarization which rotates in time at a rate controlled by a control signal provided by an associated signal generator (e.g., signal generator 135).

One application of the system of FIG. 9 relates to combining multiple light beams or signals, such as that which is performed by a beam combiner. In such a system, a plurality of optical signals, such as those provided by optical systems 100, are combined in such a manner to produce a substantially coherent wavefront, for example. In these applications, controller 905 may be used to control the signal generator 135 of each of the optical systems 100 so that rotating polarizations of each of the output beams is provided in a controlled manner.

If desired, any of the optical systems disclosed herein may alternatively be implemented instead of optical system 100. In addition, greater of fewer optical systems may be used as an alternative to the four systems shown in the figure.

Figure 10:
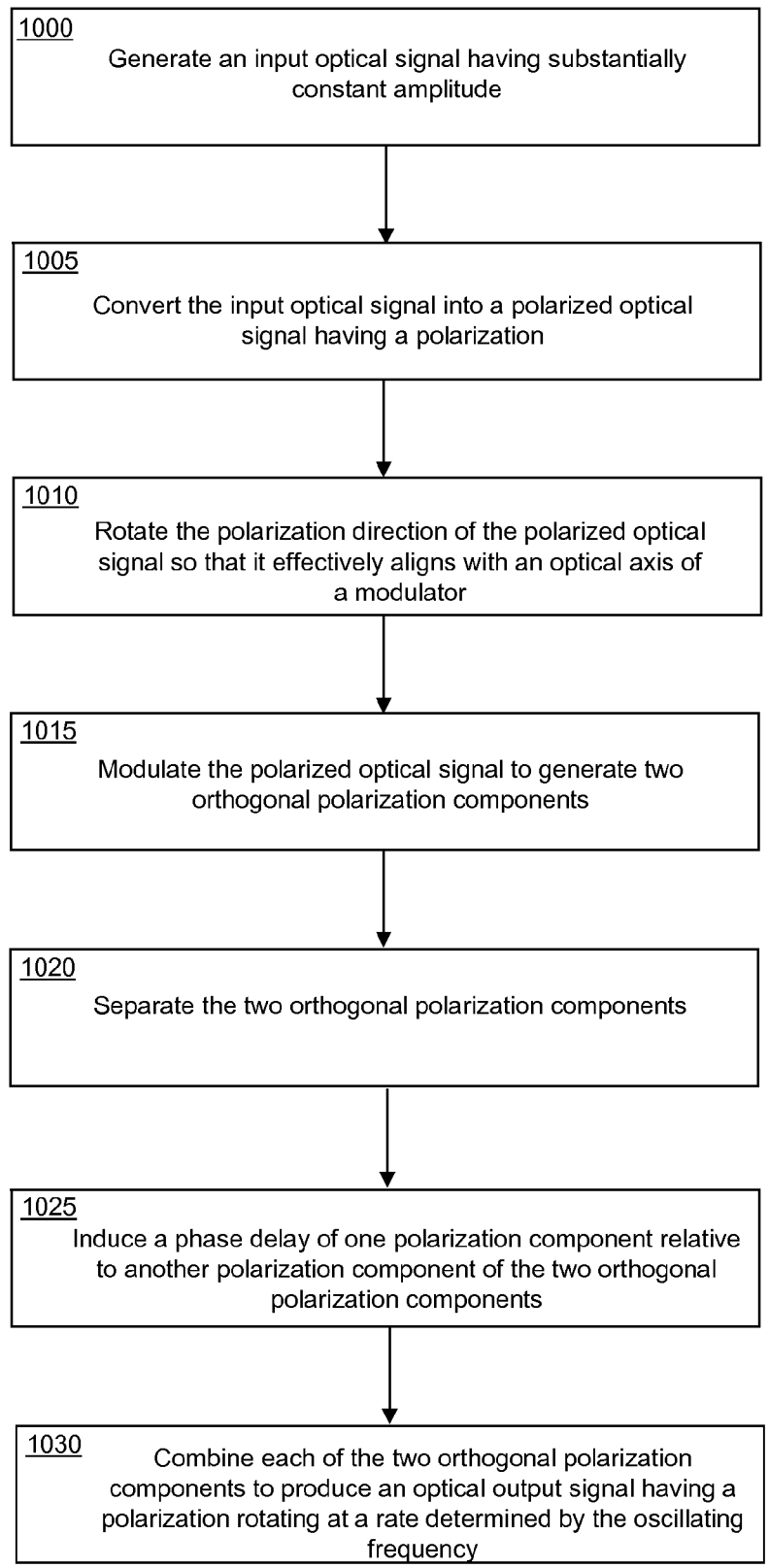
FIG. 10 is a flowchart depicting a method for rotating polarization of an optical signal in accordance with an embodiment of the present invention.

FIG. 10 is a flowchart depicting a method for changing polarization of an optical signal in accordance with an embodiment of the present invention. In some implementations, the method may be used to reduce stimulated Brillouin scattering in an optical system. This method will be described with occasional reference to the optical system depicted in FIG. 1, but it is understood that the disclosed method is not limited to the depicted system, or any other system.

Block 1000 includes generating an input optical signal having substantially constant amplitude. Source laser 105 is one example of a device which may be used to generate the input optical signal. It is understood that in some embodiments, the input optical signal is not required to have a substantially constant amplitude.

Block 1005 recites performing a polarizing function by converting the input optical signal into a polarized optical signal having a polarization. In an embodiment, the polarization of the polarized optical signal is constant or substantially constant.

Block 1010 includes rotating a polarization direction of the polarized optical signal so that the polarization of the polarized optical signal effectively aligns with an optical axis of a modulator. In an embodiment, polarizer 110 is implemented to provide the polarizing function of block 1005, and wave plate 115 is used to perform the aligning function of block

1010. If desired, some or all of the functionality of blocks 1005 and 1010 may be implemented in block 1000. In such an embodiment, the input optical signal has a polarization which effectively aligns with an optical axis of the modulator.

Block 1015 refers to modulating the polarized optical signal to generate two orthogonal polarization components. In an embodiment, this operation is responsive to an electrical or other control signal provided by signal generator 135. In one example the two orthogonal polarization components each include an amplitude which varies at a frequency. Either of modulators 125, 305, for example, may be used to provide such modulating. It is noted from the perspective of the modulators, the polarized optical signal may be referred to an input optical signal having a polarization.

Block 1020 refers to separating the two orthogonal polarization components. In FIG. 1, polarization beam splitter 140 is shown providing this function.

Block 1025 includes inducing a phase delay of one polarization component of the two orthogonal polarization components relative to another polarization component of the two orthogonal polarization components. In an embodiment, this feature is implemented using delay element 150, which is shown inducing a phase delay of the S polarization component relative to the P polarization component.

Block 1030 recites combining each of the two orthogonal polarization components to produce an optical output signal having a polarization rotating at a rate determined by the oscillating frequency. In accordance with various embodiments, this rotating polarization is achieved in a controlled manner while maintaining the coherence of the two orthogonal polarization components. Polarization beam combiner 145 is one type of component which may be used to provide the combining of block 1030.

Figure 11:
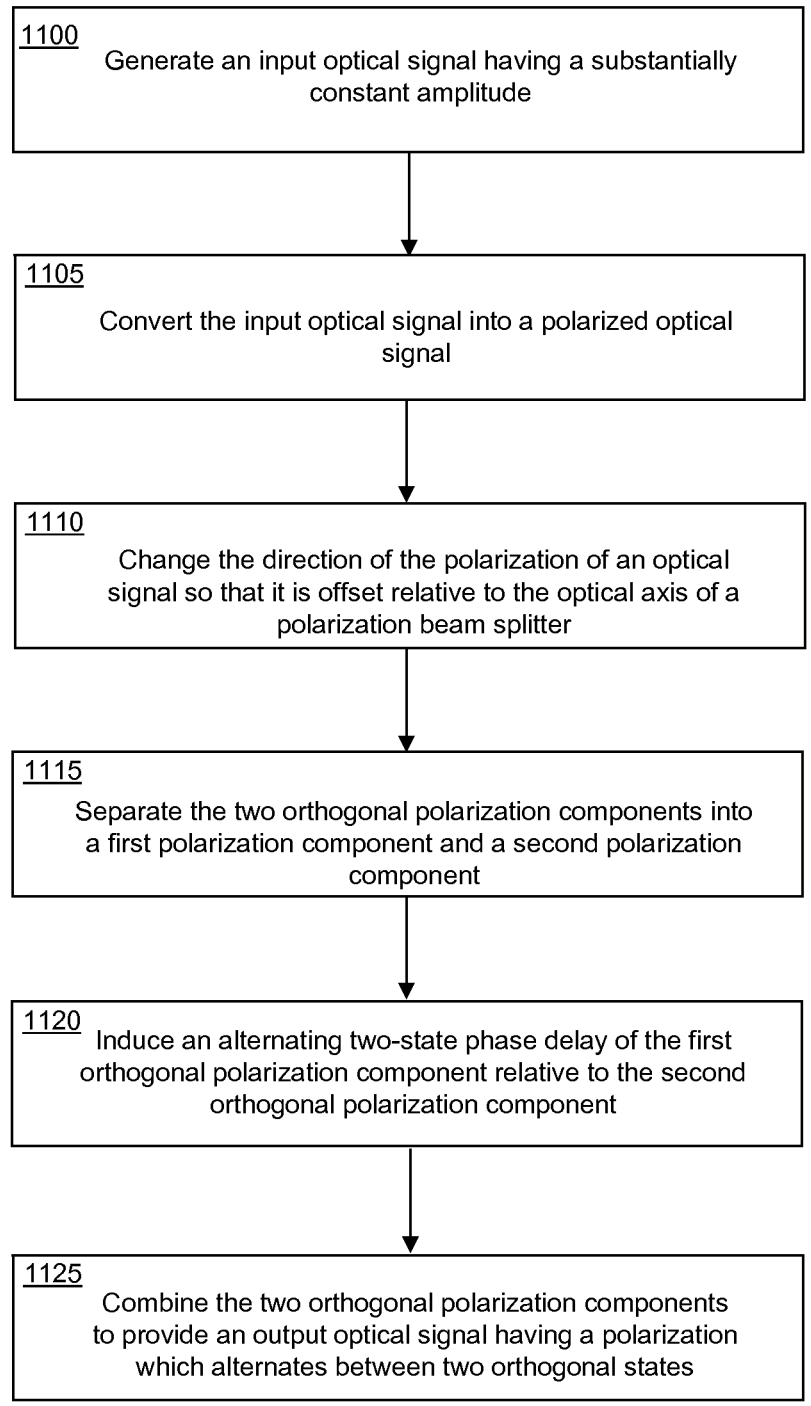
FIG. 11 is a flowchart depicting a method for switching polarization of an optical signal between two states in accordance with an alternative embodiment of the present invention.

FIG. 11 is a flowchart depicting a method for changing polarization of an optical signal in accordance with an alternative embodiment of the present invention. Similar to FIG. 10, some implementations of FIG. 11 may be used to reduce stimulated Brillouin scattering in an optical system. This method will be described with occasional reference to the optical system depicted in FIG. 6, but it is understood that the disclosed method is not limited to the depicted system, or any other system.

Block 1100 includes generating an input optical signal having a substantially constant amplitude. Source laser 105 is an example of a device which may be used to generate the input optical signal. It is understood that in some embodiments, the input optical signal is not required to have a substantially constant amplitude.

Block 1105 recites performing a polarizing function by converting the input optical signal into a polarized optical signal. In an embodiment, polarizer 110 is implemented to provide the polarizing function of block 1105.

Block 1110 includes changing the direction of the polarization of an optical signal so that the polarization of the optical signal is offset (e.g., 45 degrees) relative to the optical axis of a polarization beam splitter. This offset assists polarization beam splitter 140 in separating the two orthogonal polarization components in such a manner that each of these polarization components will have substantially equal amplitude.

As shown in FIG. 6, wave plate 115 may be used to perform the rotating function of block 1110. According to one alternative, some or all of the functionality of blocks 1105 and 1110 may be implemented in block 1100. In such an embodiment, the input optical signal has a polarization which is offset relative to the optical axis of the polarization beam splitter.

Block 1115 includes separating the two orthogonal polarization components into a first polarization component and a second polarization component. Typically, the two orthogonal polarization components have substantially equal amplitudes. In some cases, the first polarization component is directed along a first signal path and the second polarization component is directed along a second signal path. For example, the first polarization component may be the P polarization component which is directed along signal path 160, and the second polarization component may be the S polarization component which is directed along the signal path containing phase modulator 605. In some embodiments, the step of Block 1115 is performed by the polarization beam splitter 140. Further, it is noted from the perspective of the polarization beam splitter 140, the input signal may be referred to an input optical signal having a polarization.

Block 1120 includes inducing an alternating two-state phase delay of the first orthogonal polarization component relative to the second orthogonal polarization component. Phase modulator 605 is one technique for inducing this alternating two-state phase delay.

Block 1125 includes combining each of the two orthogonal polarization components (e.g., the P and S polarization components) to provide an output optical signal having a polarization which alternates between two orthogonal states. In this embodiment, the alternating two-state phase delay causes this alternating of the polarization of the output optical signal. In accordance with various embodiments, this polarization change is achieved in a controlled manner while maintaining the coherence of the two orthogonal polarization components. Polarization beam combiner 145 is one type of component which may be used to provide the combining of block 1125.

Although the embodiments of FIGS. 10 and 11 may be implemented using the exemplary series of operations described, additional or fewer operations may be performed. For instance, with regard to FIG. 10, one or more of the operations associated with blocks 1000, 1005, 1010, and 1020 may be omitted. With regard to FIG. 11, one or more of the operations associated with blocks 1100, 1105, and 1110 may be omitted. Moreover, it is to be understood that the order of operations shown and described is merely exemplary and that no single order of operation is required.

Figure 12:
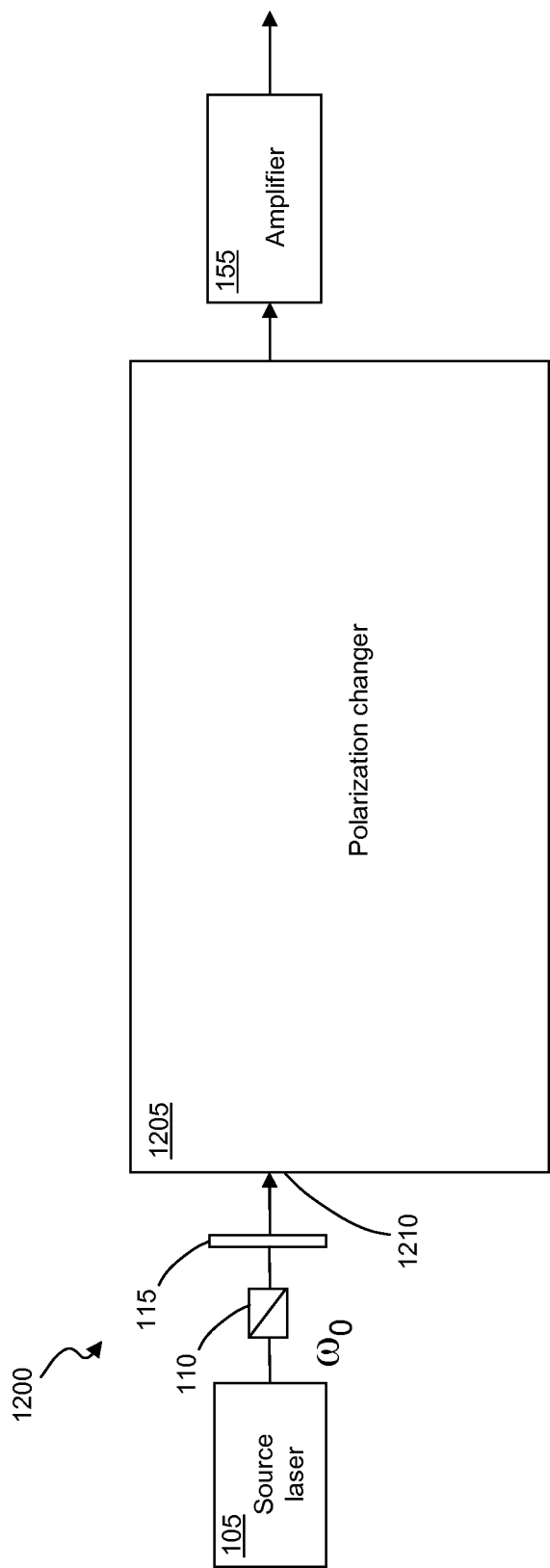
FIG. 12 is a block diagram depicting an optical system for changing polarization of an optical signal to reduce SBS in accordance with yet another embodiment of the present invention.

FIG. 12 is a block diagram depicting an optical system for changing polarization of an optical signal to reduce stimulated Brillouin scattering (SBS) in accordance with yet another embodiment of the present invention. Optical system 1200 is similar in some respects to the other optical systems disclosed herein. For instance, optical system 1200 is shown with source laser 105 generating an input optical signal which typically includes a polarization. As in other embodiments, if signal conditioning is needed or desired, the input optical signal is acted upon by one or more optional components such as polarizer 110, wave plate 115, or both components such as that depicted in FIG. 12.

When implemented, polarizer 110 functions to convert the optical signal from source laser 105 into a polarized optical signal having a polarization. In an embodiment, the polarization of the polarized optical signal is constant or substantially constant.

Polarization changer 1205 is shown having an input surface 1210 for receiving the input optical signal. In an embodiment, the polarization changer is configured to generate two orthogonal polarization components from the input optical signal and change a direction of the polarization of the input optical signal in a controlled manner. In some cases, the changing of direction of the polarization is performed while maintaining coherence of the two orthogonal polarization components. In some embodiments, it is not required to maintain coherence of the two orthogonal polarization components. Alternatively or additionally, the two orthogonal polarization components each include an amplitude which varies at a frequency.

The polarization changer may be used to change the direction of polarization in a variety of different manners. For instance, this change may be achieved by rotating the direction of the polarization of the input optical signal. In some cases, this rotation is continuous over time. Another technique includes changing the direction of the polarization of the input optical signal so that it alternates between two different (e.g., orthogonal) directions.

In rotating polarization embodiments, the input surface 1210 may be implemented by a surface of modulator 125 (FIG. 1) or amplitude modulator 305 (FIG. 3). In addition, polarization changer 1205 may be implemented as a polarization rotator which performs the polarization rotation. This example typically implements the various components associated with polarization rotator 120 (FIGS. 1 and 3).

In alternating polarization embodiments, the input surface 1210 may be implemented using polarization beam splitter 140 (FIG. 6). Moreover, the polarization alternating function may be performed using, for example, the various components associated with phase delay component 610 (FIG. 6).

In operation, polarization changer 1205 receives the input optical signal at input surface 1210. The polarization changer then generates the two orthogonal polarization components from the input optical signal and changes a direction of the polarization of the input optical signal in a controlled manner to provide an output optical signal that is provided to optional amplifier 155. It is understood that the changing of the polarization direction is achieved while maintaining coherence of the two orthogonal polarization components.

Figure 13:
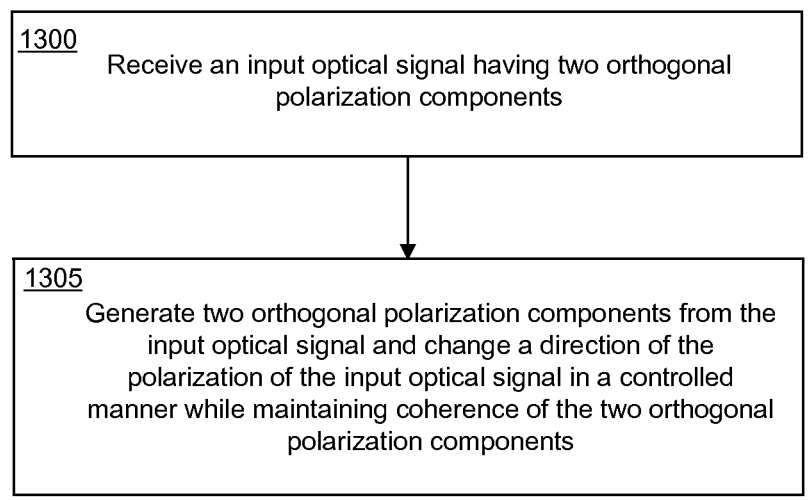
FIG. 13 is a flowchart depicting a method for changing polarization of an optical signal in accordance with still yet another alternative embodiment of the present invention.

FIG. 13 is a flowchart depicting a method for changing polarization of an optical signal in accordance with yet another alternative embodiment of the present invention. As in other embodiments, some implementations of FIG. 13 may be used to reduce stimulated Brillouin scattering in an optical system within which the optical signal propagates. This method will be described with occasional reference to the optical system depicted in FIG. 12, but it is understood that the disclosed method is not limited to the depicted system, or any other system.

Block 1300 includes receiving an input optical signal comprising two orthogonal polarization components. The input optical signal received at input surface 1210 is one technique for implementing this operation.

Block 1305 recites generating two orthogonal polarization components from the input optical signal and changing a direction of the polarization of the input optical signal in a controlled manner while maintaining coherence of the two orthogonal polarization components. In an embodiment, polarization changer 1205 is implemented to provide this function.

While the invention herein disclosed has been described by means of specific embodiments, examples and applications thereof, numerous modifications and variations could be made thereto by those skilled in the art without departing from the scope of the invention set forth in the claims.

What is claimed is:

1. An optical system of comprising:
    an input surface configured to receive an input optical signal having a polarization; and
    a polarization changer comprising the input surface and configured to generate two orthogonal polarization components from the input optical signal and change a direction of the polarization of the input optical signal in a controlled manner as a function of time while maintaining coherence of the two orthogonal polarization components;
    wherein the input optical signal has a substantially constant amplitude.

2. The system according to claim 1, wherein the polarization changer comprises:
    a modulator configured to modulate the input optical signal to generate the two orthogonal polarization components responsive to an oscillating control signal; and
    a phase delay component positioned relative to the modulator to receive the two orthogonal polarization components, the phase delay component being configured to induce a phase delay of one of the two orthogonal polarization components relative to another one of the two orthogonal polarization components, wherein the phase delay induced by the phase delay component causes rotation of the direction of the polarization of the input optical signal, at a rate controlled by the control signal, to produce an output optical signal.

3. The system according to claim 2, further comprising:
    a signal generator configured to generate the control signal.

4. The system according to claim 2, further comprising:
    an optical amplifier configured to amplify the output optical signal.

5. The system according to claim 2, wherein the phase delay induced by the phase delay component results in one of the two orthogonal polarization components to be out of phase by 90 degrees relative to another one of the two orthogonal polarization components.

6. The system according to claim 1, wherein the input optical signal is linearly polarized.

7. The system according to claim 1, further comprising an optical source configured to generate the input optical signal, wherein the optical source comprises a laser.

8. The system according to claim 1, wherein the input optical signal comprises a linearly polarized seed beam.

9. The system according to claim 1, wherein the input optical signal comprises a narrowband bandwidth.

10. The system according to claim 1, wherein the change of the direction of the polarization of the input optical signal reduces stimulated Brillouin scattering (SBS) in an optical medium within which the input optical signal propagates.

11. An optical system, comprising:
    an input surface configured to receive an input optical signal having a polarization; and
    a polarization changer comprising the input surface and configured to generate two orthogonal polarization components from the input optical signal and change a direction of the polarization of the input optical signal in a controlled manner as a function of time while maintaining coherence of the two orthogonal polarization components;
    wherein the polarization changer comprises:
    a modulator configured to modulate the input optical signal to generate the two orthogonal polarization components responsive to an oscillating control signal; and
    a phase delay component positioned relative to the modulator to receive the two orthogonal polarization components, the phase delay component being configured to induce a phase delay of one of the two orthogonal polarization components relative to another one of the two orthogonal polarization components, wherein the phase delay induced by the phase delay component causes rotation of the direction of the polarization of the input optical signal, at a rate controlled by the control signal, to produce an output optical signal;

wherein the change of the direction of the polarization of the input optical signal is continuous over time.

12. An optical system, comprising:
an input surface configured to receive an input optical signal having a polarization; and
a polarization changer comprising the input surface and configured to generate two orthogonal polarization components from the input optical signal and change a direction of the polarization of the input optical signal in a controlled manner as a function of time while maintaining coherence of the two orthogonal polarization components;
wherein the polarization of the input optical signal comprises a substantially constant amplitude.

13. The system according to claim 1, wherein the polarization changer is further configured to generate the two orthogonal polarization components which each comprise an amplitude which varies at a frequency.

14. The system according to claim 1, wherein the polarization changer comprises:
a polarization beam splitter configured to separate the two orthogonal polarization components into a first orthogonal polarization component and a second orthogonal polarization component; and
a phase modulator positioned relative to the polarization beam splitter to receive the first orthogonal polarization component, the phase modulator being configured to induce an alternating two-state phase delay of the first orthogonal polarization component relative to the second orthogonal polarization component, wherein the alternating two-state phase delay causes the direction of the polarization of the input optical signal to alternate between two different directions to produce an output optical signal.

15. The system according to claim 14, wherein a first state of the two-state phase delay causes a substantially 90 degree phase delay of the first orthogonal polarization component relative to the second orthogonal polarization component, and wherein
a second state of the two-state phase delay causes effectively no phase delay of the first orthogonal polarization component relative to the second orthogonal polarization component.

16. The system according to claim 14, wherein the two different directions are substantially orthogonal.

17. The system according to claim 14, further comprising:
an optical source configured to generate the input optical signal, wherein the input optical signal comprises a substantially constant amplitude; and
a polarizer positioned between the optical source and the polarization beam splitter to polarize the input optical signal.

18. The system according to claim 17, further comprising:
a wave plate positioned between the polarizer and the polarization beam splitter, the wave plate being configured to change the direction of the polarization of the input optical signal so that the direction of the polarization of the input optical signal is offset relative to an optical axis of the polarization beam splitter.

19. The system according to claim 14, further comprising:
a signal generator configured to generate a control signal which is provided to the phase modulator to induce the alternating two-state phase delay at a rate determined by the control signal.

20. The system according to claim 14, further comprising:
a first signal path positioned relative to the polarization beam splitter to receive the first orthogonal component;
a second signal path positioned relative to the polarization beam splitter to receive the second orthogonal component, the second signal path comprising the phase modulator; and
a polarization beam combiner optically coupled to the first signal path and the second signal path and being configured to combine each of the first orthogonal polarization component and the second orthogonal polarization component to provide the output optical signal.

21. The system according to claim 14, further comprising:
an optical amplifier configured to amplify the output optical signal.

22. An optical system, comprising:
an input surface configured to receive an input optical signal having a polarization; and
a polarization rotator comprising the input surface and configured to generate two orthogonal polarization components from the input optical signal and rotate a direction of the polarization of the input optical signal in a controlled manner as a function of time while maintaining coherence of the two orthogonal polarization components;
wherein the input optical signal has a substantially constant amplitude.

23. The system according to claim 22, wherein the polarization rotator comprises a modulator configured to generate the two orthogonal polarization components.

24. The system according to claim 22, wherein the polarization rotator is further configured to generate the two orthogonal polarization components which each comprise an amplitude which varies at a frequency.

25. The system according to claim 23, wherein the polarization rotator further comprises:
a phase delay component positioned relative to the modulator and configured to induce a phase delay of one of the two orthogonal polarization components relative to another one of the two orthogonal polarization components, wherein the phase delay induced by the phase delay component causes the rotation of the direction of the polarization of the input optical signal.

26. The system according to claim 25, wherein the direction of the polarization is rotated in a manner which reduces the effect of Brillion scattering.

27. An optical system, comprising:
an input surface configured to receive an input optical signal having two orthogonal polarization components; and
a polarization alternator comprising the input surface and configured to receive a first orthogonal polarization component of the two orthogonal polarization components, the phase modulator being configured to induce an alternating two-state phase delay of the first orthogonal polarization component relative to a second orthogonal polarization component of the two orthogonal polarization components, wherein the alternating two-state phase delay causes a direction of the polarization of the input optical signal to alternate between two different directions in a controlled manner while maintaining coherence of the two orthogonal polarization components;
wherein the input optical signal has a substantially constant amplitude.

28. A method for changing polarization of an optical signal, the method comprising:
receiving an input optical signal comprising two orthogonal polarization components;
generating two orthogonal polarization components from the input optical signal; and
changing a direction of the polarization of the input optical signal in a controlled manner while maintaining coherence of the two orthogonal polarization components;
wherein the input optical signal has a substantially constant amplitude.

29. The method according to claim 28, further comprising:
modulating the input optical signal to generate the two orthogonal polarization components according to an oscillating frequency, and wherein
the changing comprises inducing a phase delay of one polarization component of the two orthogonal polarization components relative to another polarization component of the two orthogonal polarization components to cause rotation of the direction of the polarization of the input optical signal, at a rate determined by the oscillating frequency, to produce an output optical signal.

30. The method according to claim 29, further comprising:
generating the input optical signal; and
polarizing the input optical signal.

31. The method according to claim 30, further comprising:
prior to the modulating, rotating the direction of the polarization of input optical signal so that the direction of polarization of the input optical signal effectively aligns with an optical axis of a modulator providing the modulating.

32. The method according to claim 29, further comprising:
generating the control signal operating at the oscillating frequency.

33. The method according to claim 29, further comprising:
separating the two orthogonal polarization components into separate polarization components;
directing a first polarization component of the separate polarization component along a first signal path;
directing a second polarization component of the separate polarization components along a second signal path to induce the phase delay; and
after the inducing of the phase delay, combining each of the separate polarization components to provide the output optical signal.

34. The method according to claim 28, further comprising:
separating the two orthogonal polarization components into a first orthogonal polarization component and a second orthogonal polarization component;
inducing an alternating two-state phase delay of the first orthogonal polarization component relative to the second orthogonal polarization component, and wherein
the changing comprises alternating the direction of the polarization of the input optical signal between two different directions responsive to the alternating two-state phase delay to produce an output optical signal.

35. The method according to claim 34, further comprising:
causing a substantially 90 degree phase delay of the first orthogonal polarization component relative to the second orthogonal polarization component as a result of a first state of the two-state phase delay; and
causing effectively no phase delay of the first orthogonal polarization component relative to the second orthogonal polarization component as a result of a second state of the two-state phase delay.

36. The method according to claim 34, wherein the two different directions are substantially orthogonal.

37. The method according to claim 34, further comprising:
generating the input optical signal; and
polarizing the input optical signal.

38. The method according to claim 37, further comprising:
prior to the separating, changing the direction of the polarization of the input optical signal so that the direction of the polarization of the input optical signal is offset relative to an optical axis of a polarization beam splitter providing the polarizing.

39. The method according to claim 34, further comprising:
directing the first orthogonal polarization component along a first signal path;
directing the second orthogonal polarization component along a second signal path; and
after the inducing, combining each of the separate orthogonal polarization components.

40. An optical system of comprising:
an input surface configured to receive an input optical signal having a polarization; and
a polarization changer comprising the input surface and configured to generate two orthogonal polarization components from the input optical signal and change a direction of the polarization of the input optical signal in a controlled manner as a function of time while maintaining coherence of the two orthogonal polarization components;
wherein the input optical signal comprises a continuous wave signal.

41. An optical system comprising:
an input surface configured to receive an input optical signal having a polarization; and
a polarization changer comprising the input surface and configured to generate two orthogonal polarization components from the input optical signal and change a direction of the polarization of the input optical signal in a controlled manner as a function of time while maintaining coherence of the two orthogonal polarization components;
wherein the input optical signal always has a non-zero amplitude.

42. An optical system comprising:
an input surface configured to receive an input optical signal having a polarization; and
a polarization changer comprising the input surface and configured to generate two orthogonal polarization components from the input optical signal and change a direction of the polarization of the input optical signal in a controlled manner as a function of time while maintaining coherence of the two orthogonal polarization components;
wherein the polarization changer is configured to continuously change the direction of the polarization of the input optical signal in the controlled manner as the function of time while maintaining the coherence of the two orthogonal polarization components.

43. An optical system, comprising:
an input surface configured to receive an input optical signal having a polarization; and
a polarization rotator comprising the input surface and configured to generate two orthogonal polarization components from the input optical signal and continuously rotate a direction of the polarization of the input optical signal in a controlled manner as a function of time while maintaining coherence of the two orthogonal polarization components.

44. A method for changing polarization of an optical signal, the method comprising:
  receiving an input optical signal comprising two orthogonal polarization components;
  generating two orthogonal polarization components from the input optical signal; and
  continuously changing a direction of the polarization of the input optical signal in a controlled manner while maintaining coherence of the two orthogonal polarization components.

* * * * *